(12) United States Patent
Chopinet et al.

(10) Patent No.: US 6,333,285 B1
(45) Date of Patent: Dec. 25, 2001

(54) GLASS COMPOSITION AND CHEMICALLY TEMPERED GLASS SUBSTRATE

(75) Inventors: Marie-Hélène Chopinet, Paris; Elisabeth Rouyer, Asnières; Olivier Gaume, Levallois-Perret, all of (FR)

(73) Assignee: Saint-Gobain Vitrage (FR)

( * ) Notice: Subject to any disclaimer, the term of this patent is extended or adjusted under 35 U.S.C. 154(b) by 0 days.

(21) Appl. No.: 09/202,325

(22) PCT Filed: Apr. 9, 1998

(86) PCT No.: PCT/FR98/00721

§ 371 Date: Feb. 23, 1999

§ 102(e) Date: Feb. 23, 1999

(87) PCT Pub. No.: WO98/46537

PCT Pub. Date: Oct. 22, 1998

(30) Foreign Application Priority Data

Apr. 11, 1997 (FR) .................................. 97 04508

(51) Int. Cl.[7] ........................ C03C 3/085; C03C 3/091; C03C 21/00
(52) U.S. Cl. ................ 501/69; 501/72; 428/410
(58) Field of Search .............. 501/69, 72; 428/410, 428/418

(56) References Cited

U.S. PATENT DOCUMENTS

| | | |
|---|---|---|
| 3,772,135 | 11/1973 | Hara et al. . |
| 3,790,260 * | 2/1974 | Boyd et al. . |
| 3,900,329 * | 8/1975 | Grubb et al. . |
| 4,015,045 * | 3/1977 | Rinehart ............................. 428/410 |
| 4,119,760 * | 10/1978 | Rinehart ............................. 428/410 |
| 5,773,148 | 6/1998 | Charrue et al. . |
| 5,776,844 * | 7/1998 | Koch et al. ......................... 501/70 |
| 5,780,371 * | 7/1998 | Rifq et al. ......................... 501/69 |
| 5,895,768 * | 4/1999 | Speit ................................. 501/69 |

FOREIGN PATENT DOCUMENTS

| | | |
|---|---|---|
| 2051664 | 4/1971 | (FR) . |
| 2128031 | 10/1972 | (FR) . |
| WO 94/08910 | 4/1994 | (WO) . |

OTHER PUBLICATIONS

Patent Abstract of Japan, vol. 010, No. 280 (C–374), Sep. 24, 1986 & JP 61 101433 A (Nippon Sheet Glass Co. Ltd.), May 20, 1986.

* cited by examiner

*Primary Examiner*—David R. Sample
(74) *Attorney, Agent, or Firm*—Pennie & Edmonds LLP

(57) ABSTRACT

The subject of the invention is a glass composition intended to be converted into glass ribbon, comprising the constituents below in the following proportions by weight:

| | |
|---|---|
| $SiO_2$ | 55–71% |
| $Al_2O_3$ | >2% |
| MgO | 4–11%, and > 8% if $Al_2O_3$ < 5% |
| $Na_2O$ | 9–16.5% |
| $K_2O$ | 4–10%. |

14 Claims, 1 Drawing Sheet

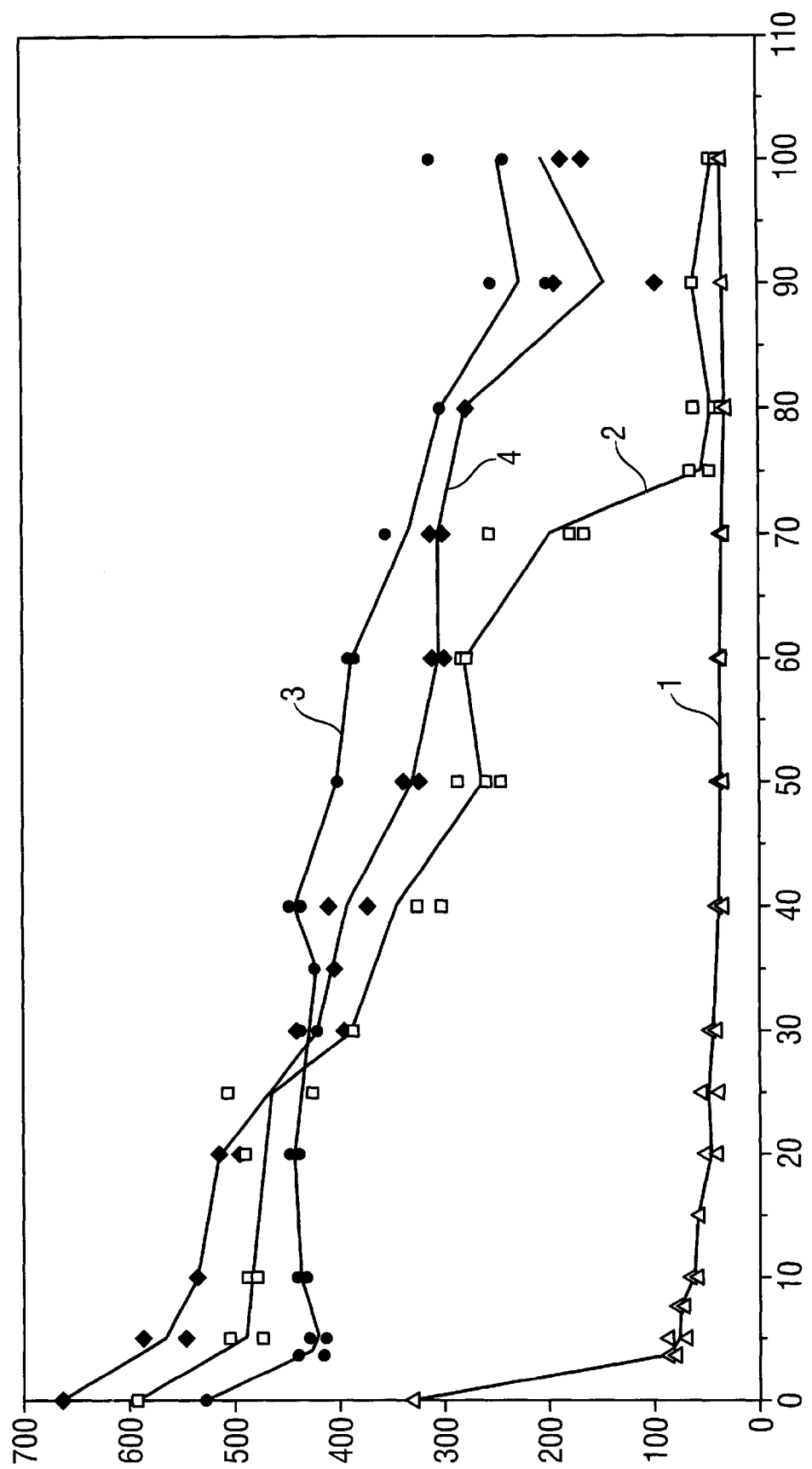

GLASS COMPOSITION AND CHEMICALLY TEMPERED GLASS SUBSTRATE

BACKGROUND OF THE INVENTION

The invention relates to compositions which can be converted into glass ribbon. The glass compositions according to the invention are more particularly intended for applications of the aeronautical-window type, without correspondingly being limited to such applications.

With regard to aeronautical-type applications, the invention is intended more particularly for windows which, after chemical toughening, may exhibit high compressive stresses over a great depth.

For these applications, especially aircraft or helicopter windows, the requirements in terms of mechanical strength are such that a strengthening operation is generally carried out by chemical means rather than simply by thermal means, as is usual, for example, for motor-vehicle windows. Chemical toughening may also be used for other very demanding applications such as, for example, the windows for armoured, railway or maritime vehicles, or else for motor vehicles.

As in the case of thermal toughening, chemical toughening consists in putting the surface of the glass into compression, the rupture strength of the glass being increased by an amount that is more or less identical to the magnitude of the compressive surface stress generated by the treatment, in this case generated by substituting some of the alkali metal ions of the surface layers of the glass with other less bulky ions which will be inserted into the glassy network.

In the case of forces exerted over the entire window, for example the pressure exerted by the air in a pressurized cockpit, and in the case of more dynamic forces, for example a bird strike, the impact of which generates a very high force which may cause the glass to break starting from a face in extension exhibiting surface defects, the quality of the mechanical strengthening is dictated, on the one hand, by the value of the compressive surface stress and, on the other hand, by the treated depth. Ideally, the object of the chemical toughening operation is thus to place the surface layers of the glass article treated under a very high compressive stress over a very great depth, at least equal to the depth of the largest possible defect.

For a given glass composition, the exchanged depth depends on the duration of the ion-exchange treatment and on the temperature at which it is carried out. However, a rise in temperature results in an increase in the rate of relaxation of the stresses and consequently results in low rupture stresses. Likewise, extending the treatment for too long a period results in an unsatisfactory degree of toughening, the stresses then having the necessary time to relax.

These considerations have resulted in the development of novel glass compositions which are more favourable to ion exchange than conventional window glass compositions and, especially, allow greater exchange depths to be obtained for treatment times not exceeding a few hours. Thus, Patent Application FR-A-2,128,031 provides silica-soda glasses, using oxides commonly encountered in conventional industrial glasses, satisfying the following composition, defined by its percentages by weight:

| | |
|---|---|
| $SiO_2$ | 65.0–76.0% |
| $Al_2O_3$ | 1.5–5.0% |
| MgO | 4.0–8.0% |
| CaO | 0.0–4.5% |
| $Na_2O$ | 10.0–12.0% |
| $K_2O$ | 1.0–4.0% |
| $B_2O_3$ | 0.0–4.0% | these elements representing at least 96% by weight of the glass and furthermore satisfying the percentages by weight CaO/[CaO+MgO] between 0 and 0.45, and $K_2O/[Na_2O+K_2O]$ between 0.05 and 0.35, these limits being inclusive.

The compositions defined hereinabove make it possible, after 24 hours, to obtain a reinforcement depth which is from 1.8 to 3.3 times greater than the depth obtained with ordinary window glass. However, in Patent Application FR-A-2,128,031 the ion-exchange processes are relatively short, these being systematically limited to times of at most 24 hours, which allows the thickness of the reinforced layer to reach at most approximately 100 microns (for a 400° C. treatment temperature). However, for aeronautical applications in particular, this thickness must be much greater, for example approximately 300 microns, which comes back to the problem mentioned earlier with conventional glass compositions.

It has also already been demonstrated, in Patent EP-0,665,822, that such glass compositions are also suitable for long treatments, typically of at least 72 hours and especially of more than 10 days or even more than 15 days—the treatments may in some cases exceed some twenty days—and can consequently be used to obtain glass articles strengthened by ion exchange to a great depth, for example 200 microns or more, while at the same time maintaining very satisfactory strengthening levels, for example with compressive surface stresses of at least 400 MPa. Thus, glass products, the composition of which satisfies the formula known from Patent FR-A-2,128,031, and which have undergone a strengthening treatment by ion exchange at a temperature such that the compressive surface stress is at least 400 MPa and preferably at least 500 MPa, for a treated depth of at least 200 microns, or alternatively articles whose compressive surface stress is at least 650 MPa, for a treated depth of at least 75 microns, have been described.

By way of indication, the treatment carried out may, for example, be for 18 days at a temperature of 415° C., which results in compressive surface stresses of approximately 500 MPa, and an exchanged depth of approximately 265 microns. If the envisaged application can allow shallower treatment depths, it is also possible to obtain substantially greater strengthening levels with, for example, compressive surface stresses of approximately 700 MPa or higher, using low-temperature (for example 350° C.) treatments for times which are more or less identical to the previous case, this time with a treatment depth of approximately 80 microns.

Although the mechanical properties obtained are satisfactory, it appears all the same that they require relatively long toughening treatment times.

Moreover, apart from the requirements regarding the mechanical properties, it is necessary, more particularly in the case of aeroplane windows, to obtain good chemical resistance and, especially, good hydrolytic resistance. This is because the consumption of glass for this type of product is relatively low compared with the production capacities of furnaces in the glass industry; it is therefore desirable to keep the glass for a time which may be up to several years, while maintaining the properties of the glass.

SUMMARY OF THE INVENTION

Thus, the objection of the invention is to provide glass compositions having good hydrolytic resistance combined with the capability of undergoing chemical toughening resulting in stresses such as those required for applications of the aeronautical window type, the treatment times necessary to obtain these stresses being shorter than those for known compositions.

This object is achieved according to the invention by a glass composition intended to be converted into glass ribbon, comprising the constituents below in the following proportions by weight:

| | |
|---|---|
| $SiO_2$ | 55–71% |
| $Al_2O_3$ | >2% |
| MgO | 4–11%, and >8% if $Al_2O_3$ < 5% |
| $Na_2O$ | 9–16.5% |
| $K_2O$ | 4–10% |

BRIEF DESCRIPTION OF THE DRAWINGS

FIG. 1 is a graph showing curves representing the strength characteristics of the glass of the present invention.

DETAILED DESCRIPTION OF THE INVENTION

Preferably, the composition according to the invention satisfies the following: percentage by weight $Na_2O/K_2O<1.8$ and preferably <1.4. These preferred compositions allow even shorter treatment times, resulting in satisfactory stresses equivalent to those of the prior techniques. This is because it appears that these compositions allow better diffusion during the toughening operation, without greater stress relaxation.

The compositions defined above have in effect the advantage of combining good hydrolytic resistance with the capability of being chemically strengthened, especially for the purpose of aeronautical applications.

According to a preferred embodiment of the invention, the sum of the percentages by weight of the alkali metal oxides is less than 23% and preferably less than 21%. Too high a content of alkali metal oxides decreases the hydrolytic resistance.

The $Na_2O$ content is advantageously less than 14% and the K2O content is preferably greater than 7%. The oxides $Na_2O$ and K2O make it possible to keep the melting point of the glasses according to the invention and their high-temperature viscosities within acceptable limits. The simultaneous presence of these two oxides in proportions as defined allows the chemical resistance of the glass, more particularly the hydrolytic resistance, as well as the resistivity, to be considerably increased.

The inventors define the composition further as advantageously possessing an alkalinity of less than 15 and preferably of less than 10.

In the context of the invention, the $SiO_2$ content must not exceed approximately 71%; above this the melting of the batch and the refining of the glass require high temperatures which accelerate the wear of the furnace refractories. Below 55%, the glasses according to the invention are insufficiently stable. The glasses according to the invention which melt most easily, the viscosities of which lend themselves best to the glass being able to float on a bath of molten metal, and which exhibit good hydrolytic resistance and superior aptitude to chemical strengthening comprise between 60 and 65% $SiO_2$.

The MgO content is preferably greater than 7%. This element is conducive to the melting of these glass compositions, improves the high-temperature viscosity and also contributes to increasing the hydrolytic resistance of the glasses. Although other alkaline-earth elements may be present in the composition, CaO, which in chemical toughening is a deleterious compound, is preferably present only in the form of an impurity with a weight content of less than 0.5%.

The alumina acts as stabilizer. This oxide increases the chemical resistance of the glass to a certain extent. The $Al_2O_3$ content must not exceed 18% for fear of making the glass too difficult to melt and of increasing the high-temperature viscosity of the glass to an unacceptably high level. Advantageously, it is less than 14%.

The glass compositions according to the invention may further include the oxide $B_2O_3$. The $B_2O_3$ content then does not exceed 4% since, above this value, the volatilisation of the boron in the presence of alkali metal oxides during production of the glass may become significant and may result in corrosion of the refractories. Furthermore, higher $B_2O_3$ contents impair the quality of the glass. When $B_2O_3$ is present in the glass composition with a content greater than 2%, the $Al_2O_3$ is advantageously greater than 10%.

According to a preferred embodiment of the invention, the $B_2O_3$ content is less than 2%, and in this case the $Al_2O_3$ content is less than 10%.

The glass compositions may furthermore contain colouring agents, especially for applications of the motor-vehicle window type; these may, for example, be iron oxides, chromium oxides, cobalt oxides, nickel oxides, selenium oxides, etc. The invention also provides for the glass compositions to have a light transmission and an energy transmission which may be adapted, according to the principles known to those skilled in the art, depending on the intended applications. Advantageously, the light transmission is greater than 71%.

Among the compositions according to the invention, those of choice will be those which have a forming range around 1050–1150° C., remembering that in the float process the forming range corresponds to the range of temperatures for which the viscosity of the glass, expressed in poise, is between 1585 (log π=3.2) and 5000 (log π=3.7).

More preferably, the compositions used have a temperature, corresponding to the viscosity log π=3.5, of greater than the liquidus temperature ($T_{liq}$), the difference between these two temperatures preferably being greater than 10° C. and preferably greater than 20° C. In this way, the glass may be obtained using the float process without the risk of devitrification.

Another property exhibited by the compositions according to the invention is that their expansion coefficient is greater than $90 \times 10^{-7}$° $C.^{-1}$. This characteristic shows that these compositions are suitable for undergoing thermal toughening.

More particularly for aeronautical-type applications, the windows are coated with layers, for example deposited by pyrolysis. The invention advantageously provides compositions which allow such coatings to be deposited without unacceptably relaxing the stresses. Advantageously, the compositions according to the invention have an upper annealing temperature $T_s$ (that point on the dilatometric curve as defined in the work "Glass" by Horst Scholze) of greater than 500° C. and preferably of greater than 540° C.

The subject of the invention is also glass substrates whose matrix satisfies one of the above compositions and which has been strengthened by ion exchange for the purpose of an aeronautical-type application. For those skilled in the art, the compositions according to the invention surprisingly have sufficient compressive surface stress levels for toughening treatments of shorter duration than the latest prior-art techniques mentioned; relaxation of the said compressive stresses is not as great as those skilled in the art might have thought for such treatment times. It is in fact possible to obtain glass substrates which, after chemical toughening, have compressive stress levels at least equal to 400 MPa, which is suitable for the intended applications.

According to a first embodiment of the invention, the glass substrate is strengthened by surface ion exchange to a surface exchange depth of greater than 200 microns and it has compressive surface stresses of greater than 400 MPa.

According to another embodiment, the glass substrate is strengthened by surface ion exchange to a surface exchange depth of greater than 50 microns and it has compressive surface stresses of greater than 700 MPa.

The invention furthermore provides a process for obtaining a glass substrate, consisting in forming the glass in a float-type plant and then in treating the substrate by potassium ion exchange for a time of at least 24 hours and at a temperature of between 350° C. and 500° C.

Further details and advantageous characteristics of the invention will emerge below from the examples presented in according with the invention.

Tests were carried out on various glass matrices satisfying the following formulae (expressed in percentages by weight).

Example 1 illustrates a composition according to the prior art and satisfies the required criteria for aeronautical applications. The composition according to Example 1 is an example illustrating Patent EP-0,665,822.

|  | EX. 1 | EX. 2 | EX. 3 | EX. 4 | EX. 5 | EX. 6 |
| --- | --- | --- | --- | --- | --- | --- |
| $SiO_2$ | 66.66 | 62.00 | 61.05 | 66.1 | 67 | 63.5 |
| $Al_2O_3$ | 4.59 | 8.65 | 8.05 | 7.5 | 2.8 | 6 |
| MgO | 6.89 | 7.74 | 7.90 | 4.35 | 10.05 | 9 |
| CaO | — | 0.39 | 0.36 | — | — | — |
| $Na_2O$ | 12.2 | 10.90 | 12.55 | 15.85 | 10.15 | 12 |
| $K_2O$ | 6.16 | 9.48 | 9.50 | 5.2 | 9.4 | 9.5 |
| $B_2O_3$ | 3.44 | 0 | 0 | 0.15 | 0.1 | — |
| Various | 0.06 | 0.84 | 0.59 | 0.85 | 0.5 | — |
| $T_s$ | 550 | 544 | 549 | 518 | 549 | 551 |
| $\alpha$ (20–300° C.) $10^{-7}$ °C.$^{-1}$ | 93.4 | 101.7 | 108.4 | 111.8 | 101.7 | 107.8 |
| $T_{log\eta=2}$ (° C.) | 1483 | 1551 | 1504 | 1500 | 1507 | 1500 |
| $T_{log\eta=3.5}$ (° C.) | 1126 | 1214 | 1164 | 1135 | 1167 | 1165 |
| $T_{liq}$ (° C.) | 880 | >1100 | >1100 | 980 | 1020 | >1100 |

The last three rows in the table indicate the temperatures corresponding, in the first case, to the viscosity log $\pi$=2, which is the temperature in the melting bath, in the second case to the viscosity log $\pi$=3.5, which is the chosen temperature at which the glass enters the bath of molten metal, and finally, in the third case, to the liquidus ($T_{liq}$).

This first information already shows that these glass compositions according to the invention may constitute glass substrates obtained using the float technique.

The next table shows various types of toughening treatment in a potassium nitrate bath, in which the temperature and the duration of the treatments vary. These various treatments were carried out on a composition according to the invention, defined by Example 2.

|  | Treatment temperature | Time (days) | Surface stress (MPa) | Depth (microns) |
| --- | --- | --- | --- | --- |
| 1 | 380° C. | 2 | 600 | 90 |
| 2 | 406° C. | 2 | 560 | 125 |
| 3 | 406° C. | 9 | 500 | 255 |
| 4 | 406° C. | 15 | 460 | 320 |
| 5 | 425° C. | 2 | 490 | 160 |
| 6 | 425° C. | 8 | 430 | 315 |
| 7 | 425° C. | 12 | 410 | 375 |
| 8 | 460° C. | 2 | 400 | 265 |
| 9 | 460° C. | 8 | 300 | 510 |
| 10 | 460° C. | 12 | 270 | 630 |

The second table illustrates treatments for examples of compositions 3, 4, 5 and 6:

|  | Treatment temperature | Time (days) | Surface stress (MPa) | Depth (microns) |
| --- | --- | --- | --- | --- |
| 3 | 406° C. | 15 | 475 | 365 |
| 4 | 406° C. | 10 | 260 | 330 |
| 5 | 406° C. | 15 | 455 | 320 |
| 6 | 406° C. | 15 | 430 | 345 |

The above tables show that the compositions according to the invention are particularly favourable to ion exchange in a potassium nitrate bath. It is clearly apparent that the glasses of the invention allow very high compressive stress levels to be obtained for exchanged depths which are satisfactory for aeronautical applications. The expected reduction in the values of rupture strength is indeed confirmed as the treatment time increases, but this reduction, due to the onset of stress relaxation, is not so much that it results in low levels.

In the following table, a chemical toughening treatment carried out on the composition according to Example 1 is compared with various treatments carried out on a composition according to Example 2.

| Composition |  | EX. 1 | EX. 2 | EX. 2 | EX. 2 | EX. 2 |
| --- | --- | --- | --- | --- | --- | --- |
| Chemical toughening treatment | Time (days) | 12 | 12 | 15 | 8 | 6 |
|  | Temperature (° C.) | 425 | 425 | 406 | 425 | 425 |
| Surface stress (MPa) |  | 450 | 410 | 460 | 430 | 470 |
| Depth (microns) |  | 260 | 375 | 320 | 315 | 290 |

In the light of this table, it is apparent that compositions according to the invention lead to results which are at least satisfactory as, or even better than, those obtained using the composition according to Example 1.

In addition, it is apparent that a treatment at a temperature of 425° C. for a time of 6 days leads to a better result than that obtained by a treatment at 425° C. for a time of 12 days using a composition such as that of Example 1. The latter results are deemed to be satisfactory for aeronautical-type applications. It is therefore clearly apparent that compositions according to the invention will allow results to be obtained which are equivalent to those of Example 1 using shorter treatment times and therefore at a lower cost.

The following table presents the hydrolytic resistance properties of the glasses according to the invention. This table gives the residue and alkalinity of the compositions according to the invention, these values being obtained by water-digestion of the glass in granulate form.

Water digestion of the glass in granulate form, or "DGG", is a method which consists of immersing 10 grams of ground glass, the size of the granules of which is between 360 and 400 microns, in 100 millilitres of water heated to boiling for 5 hours. After rapid cooling, the solution is filtered and a defined volume of filtrate is evaporated to dryness. The weight of dry matter obtained allows the amount of glass dissolved in the water, or residue, to be calculated; this amount is expressed in milligrams for an initial glass mass equivalent to 4 times the relative density (i.e. 10 g for a relative density of 2.5).

As regards the alkalinity, this is the average mass, in mg, of dissolved alkaline substances for an initial glass mass equivalent to 4 times the relative density.

|  | 1 | 2 | 3 | 4 | 5 | 6 |
|---|---|---|---|---|---|---|
| Residues | 15.3 | 15.4 | 20.2 | 30.7 | 26.7 | 23.5 |
| Alkalinity | 4.2 | 5 | 8.9 | 15 | 8.5 | 9 |

Moreover, it is apparent that the windows according to the invention exhibit very high resistance to localized damage, for example resistance to impact by small hard particles.

The curves in the figure appended hereto illustrate this property. These curves were obtained from tests carried out on 70×70 mm test pieces. The tests consist in measuring the modulus of rupture using a three-point bending test: loading with a ring, 10 mm in diameter and of 1 mm torus, on a support consisting of 3 equidistant balls placed on a circle of 20 mm radius. For each type of test piece, these moduli of rupture are also measured after forming a defect. To do this, a Vickers indentation is made with a given load (from 3 to 100 N) at the centre of the test pieces on that face which is in extension during the test. The results are shown in the figure, which has four curves expressing, as ordinates, the modulus of rupture (in MPa) and, as abscissae, the indentation load (in N).

Curve 1 shows the results of the test on test pieces made of a non-strengthened soda-lime glass.

Curve 2 shows the results of the tests on test pieces made of a glass according to Example 1 strengthened at 425° C. for 12 days.

Curve 3 shows the results of the tests on test pieces made of a glass according to Example 4 strengthened at 406° C. for 10 days.

Curve 4 shows the results of the tests on test pieces made of a glass according to Example 5 strengthened at 406° C. for 15 days.

These curves demonstrate the superior performance of the chemically strengthened glasses compared with the ordinary soda-lime glass. They also show comparable or even superior performance, especially Examples 4 and 5, in the case of high indentation loads, compared with Example 1.

The windows according to the invention are most especially applied in composite windows, such as aircraft windscreens and, more generally, are used in any aeronautical application or in any usual application of toughened glass, in particular for motor-vehicle windows, armoured windows or railway windows.

What is claimed is:

1. Glass composition intended to be converted into glass ribbon, comprising the following constituents in the following proportions by weight:

| | |
|---|---|
| $SiO_2$ | 55–71% |
| $Al_2O_3$ | greater than 2, but less than 10% |
| MgO | 4–11%, and 8–11% if $Al_2O_3$ < 5% |
| $Na_2O$ | 9–16.5% |
| $K_2O$ | 4–10% |
| $B_2O_3$ | <2%; | wherein the ratio of percentage by weight of $Na_2O/K_2O$ is less than 1.8.

2. Glass composition according to claim 1, wherein the sum of the weight percentages of the alkali metal oxides is less than 23%.

3. Glass composition according to claim 1, wherein the alkalinity is less than 15.

4. Glass composition according to claim 3, wherein the alkalinity is less than 10.

5. Glass composition according to claim 1, wherein CaO is present only in the form of impurities.

6. Glass composition according to claim 1, wherein the composition is capable of being converted into glass ribbon using the float process in which the glass is cast onto a bath of molten tin.

7. Glass composition according to claim 1, wherein the composition has an expansion coefficient greater than $90 \times 10^{-7}$ °C.$^{-1}$.

8. Glass composition according to claim 1, wherein the composition has an annealing temperature $T_s$ greater than 500° C.

9. Glass composition according to claim 8 wherein the composition has an annealing temperature $T_s$ greater than 540° C.

10. Glass substrate, the matrix of which satisfies the composition according to claim 1, wherein the glass substrate is formed in a float-type plant and treated by potassium ion exchange for a time of at least 24 hours at a temperature of between 350° and 500° C.

11. Glass substrate, the matrix of which satisfies the composition according to claim 1, wherein the substrate is strengthened by surface ion exchange to a surface exchange depth of greater than 200 microns, and has compressive surface stresses of greater than 400 MPa.

12. Glass substrate, the matrix of which satisfies the composition according to claim 1, wherein the substrate is strengthened by surface ion exchange to a surface exchange depth of greater than 50 microns, and has compressive surface stresses of greater than 700 MPa.

13. Glass composition according to claim 1, wherein the ratio of percentage by weight of $Na_2O/K_2O$ is less than 1.4.

14. Process for obtaining a glass substrate comprised of a composition having the following constituents in the following proportions by weight:

| | |
|---|---|
| $SiO_2$ | 55–71% |
| $Al_2O_3$ | greater than 2, but less than 10% |
| MgO | 4–11%, and 8–11% if $Al_2O_3$ < 5% |
| $Na_2O$ | 9–16.5% |
| $K_2O$ | 4–10% |
| $B_2O_3$ | <2%; | wherein the ratio of percentage by weight of $Na_2O/K_2O$ is less than 1.8; and the process including forming the substrate.

* * * * *

UNITED STATES PATENT AND TRADEMARK OFFICE
CERTIFICATE OF CORRECTION

PATENT NO. : 6,333,285 B1
DATED : December 25, 2001
INVENTOR(S) : Marie-Hélène Chopinete, Elisabeth Rouyer, and Olivier Gaume It is certified that error appears in the above-identified patent and that said Letters Patent is hereby corrected as shown below:

<u>Claim 7,</u>
Line 3, change "$90 \times 10^{-7\circ}C^{-1}$" to -- $90 \times 10^{-7}\circ C^{-1}$ --

Signed and Sealed this

Twelfth Day of March, 2002

*Attest:*

JAMES E. ROGAN
*Attesting Officer*     *Director of the United States Patent and Trademark Office*